UNITED STATES PATENT OFFICE.

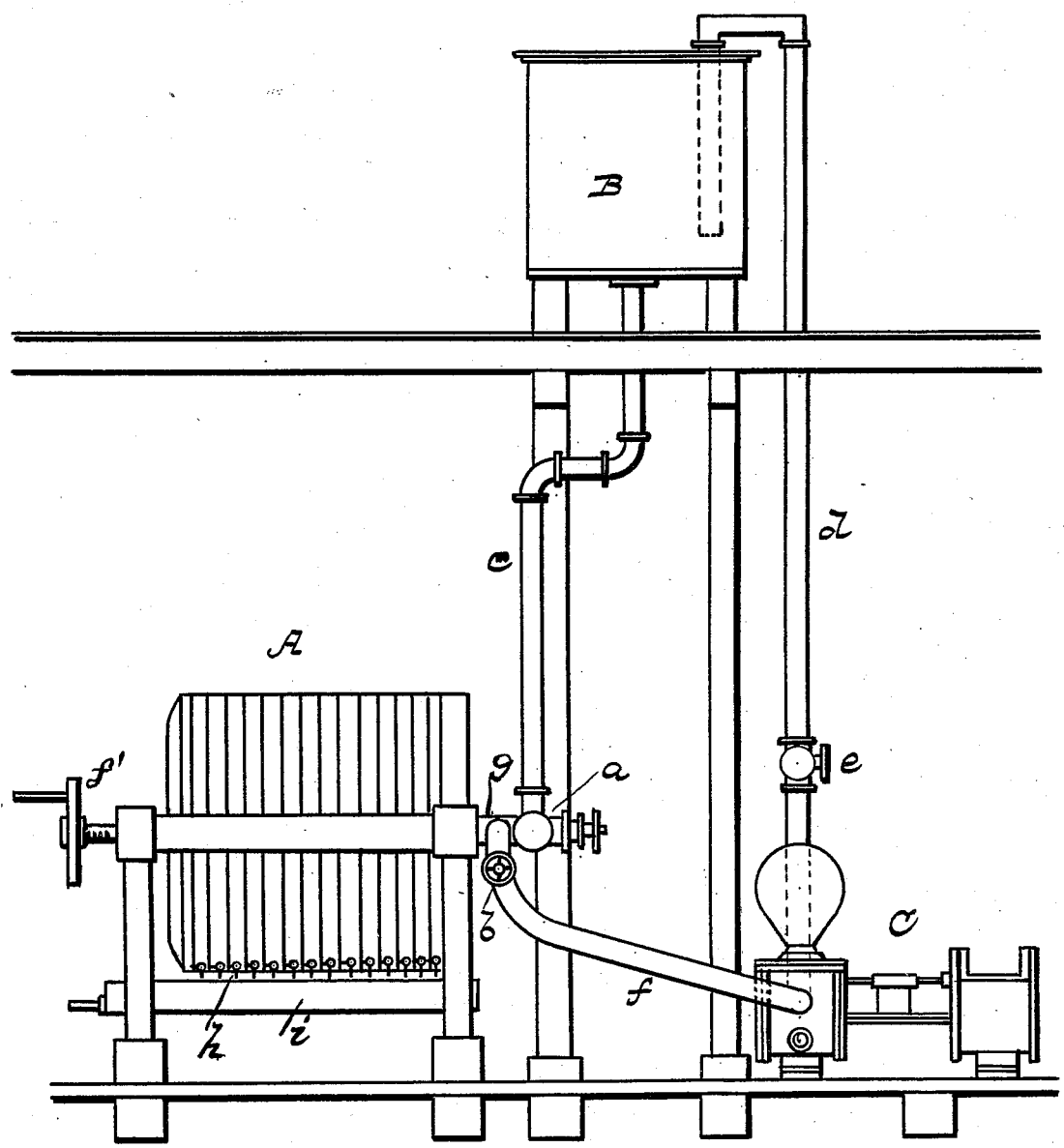

BERNHARD REMMERS, OF NEW YORK, N. Y., ASSIGNOR OF ONE-HALF TO ALEX. P. MENDE, OF SAME PLACE.

PROCESS OF PURIFYING WATER.

SPECIFICATION forming part of Letters Patent No. 521,964, dated June 26, 1894.

Application filed December 23, 1893. Serial No. 494,580. (No specimens.)

*To all whom it may concern:*

Be it known that I, BERNHARD REMMERS, a citizen of the United States, residing at New York, in the county of New York and State of New York, have invented certain new and useful improvements in processes of treating and recovering valuable products from wash and waste waters or other liquids and of purifying, decolorizing, or deodorizing liquids; and I do hereby declare the following to be a full, clear, and exact description of the invention, such as will enable others skilled in the art to which it appertains to make and use the same.

This invention has relation to improvements in processes of treating and recovering valuable products from wash or waste waters from factories or the like or from other liquids; for purifying, decolorizing and deodorizing such waste water or liquids, thus providing means whereby the liquids are purified prior to their escape into the streams, relieving said liquids of all organic matter; thus serving a two fold purpose viz., the liquids after being treated by my process, become pure and will not pollute a stream or body of water and the retention of the valuable products which are separated from said liquids is effected.

In the accompanying drawing, the figure represents a side elevation of the devices I use in my process.

A, designates a press, composed of a series of frames; a screw $f'$ for pressing these frames together and B, is the receiving tank for the waste water and is connected to the press A, by a pipe $c$.

C, represents an air pump; a pipe $d$ of which extends therefrom to the top of the tank and into the same, as shown in dotted lines. A pipe $f$ connects the air pump with the horizontal pipe $g$ of the press, having a shut off valve $b$. Said pipes $g$ and $c$ are provided with the shut off valve $a$. It will be seen that the waste water is emptied into the tank B; the valve $a$ opened and the valve $b$ closed when said water will flow through the pipe $c$ and into the press, filtered therein and the clear water passing out the faucets $h$, into the trough $i$ and carried off.

In agitating the waste water in the tank, the valve $b$ is closed and valve $e$ opened and the pump C, forcing air through the pipe $d$ and into the tank at same time valve $a$ may be shut off while the water in the tank is being agitated. To force air into the press in filtering, the valve $b$, is opened and valve $e$, is closed; the valve $a$ is also closed after the water has passed from the tank into the press, and the air forced into said press through the pipes $f$, $g$, causes the water to readily separate from the organic matter and leave the latter in a uniform cake upon the filtering frames.

Heretofore such liquids or the magma, after the large amount of water had been decanted, have been attempted to be filtered, but have met with failure on account of pump or pumps being used for forcing solids, which latter are forced so closely together against filtering cloths, that the cake spaces remain filled with thin magma only instead of forming solid cakes and a perfectly clear filtrate thus making the use of filter presses impracticable.

Now, by my improved process I take the liquids or waters immediately as they come from the washings, or other uses to which the same have been put, and transfer them to receptacles or tanks, and add thereto charcoal, and keep said liquids under constant agitation by means of air from an air blower or air compressor, which causes immediate precipitation of the organic matter. After which I put the whole, at once, through a filter press, by gravity or by means of a montejus; in which case I obtain solid cakes of matter and a perfectly clear filtrate without any loss of said organic matter.

In some cases it is desirable to continue the agitation of the fluids during filtration and it may also be advisable to use certain chemicals or charcoal (vegetable) or prussiate waste in decolorizing, deodorizing and assisting in filtration, which should be added before the filtering process has commenced, and also in order to obtain solid cakes of matter with the least moisture, I force air through the press and cakes of matter therein by the blower and through the feed opening thereof or through lixiviating channels made in the press for that purpose. Thus it will be readily seen that by my improved process of treating the liquid the same is under constant agitation, when the same is in the tank and also in the press which force of air readily separates the organic matter from said liquids and such a process is inexpensive, easily understood and quickly applied to the matter and the cakes of matter within the press are further dried after the operation, and by my process I prevent thin films of solids from forming on the filtering cloths in the press; which film is impermeable to further filtration. This, it will be seen, I avoid and provide a process whereby the forced air further separates the matter from the liquids, and leaving solid cakes of matter upon the filtering cloth or cloths within the press.

Having thus described my invention, what I claim, and desire to secure by Letters Patent, is—

The process herein described for separating organic matter from waste liquids and purifying, decolorizing and deodorizing liquids consisting in adding thereto vegetable charcoal or prussiate waste and subjecting the liquid to air pressure for agitation before said liquids are passed into a filtering press and also while said liquids are in the filtering press substantially as described.

In testimony whereof I affix my signature in presence of two witnesses.

BERNHARD REMMERS.

Witnesses:
MARY F. KEATING,
HENRY STAEBLER.